United States Patent [19]
Chevance

[11] Patent Number: 4,782,715
[45] Date of Patent: Nov. 8, 1988

[54] SYSTEM FOR LOCKING A LINEAR DEVICE FOR RAPIDLY ADJUSTING AND IMMOBILIZING A MOVABLE PART RELATIVE TO A FIXED PART

[75] Inventor: Claude Chevance, Savigny-sur-Orge, France

[73] Assignee: Rockwell-CIM, France

[21] Appl. No.: 107,696

[22] Filed: Oct. 13, 1987

[30] Foreign Application Priority Data

Oct. 13, 1986 [FR] France ................... 86 14179

[51] Int. Cl.⁴ ............................................. F16H 25/20
[52] U.S. Cl. ........................... 74/424.8 R; 74/89.15;
74/411.5; 188/196 D; 188/67; 188/202
[58] Field of Search ............ 74/89.15, 411.5, 424.8 R,
74/586; 188/67, 196 D, 202; 297/348, 355, 361

[56] References Cited

U.S. PATENT DOCUMENTS

| | | |
|---|---|---|
| 2,579,305 | 12/1951 | Cushman ........................ 74/586 |
| 3,046,055 | 7/1962 | Martens .................... 188/196 D |
| 3,127,788 | 4/1964 | Martens ........................ 74/586 |
| 3,246,868 | 4/1966 | Martens et al. ............... 297/361 |
| 3,350,135 | 10/1967 | Martens ....................... 297/355 |
| 3,356,411 | 12/1967 | Homier et al. ................ 297/355 |
| 3,398,986 | 8/1968 | Homier ........................ 297/355 |
| 3,436,973 | 4/1969 | Aweimrine ................... 74/89.15 |
| 3,479,890 | 11/1969 | Howell ....................... 74/89.15 |
| 4,589,301 | 5/1986 | Griner ........................ 74/586 |
| 4,630,866 | 12/1986 | McFarlane ................ 74/424.8 R |

FOREIGN PATENT DOCUMENTS 140499  5/1953  Sweden ..................... 188/196 D

Primary Examiner—Lawrence Staab

[57] ABSTRACT

The adjusting device (7) comprises a screw (8) and a nut (12) engaged in a housing (16). The latter and the screw cooperate with a fixed part and a movable part. The locking system comprises a locking cylinder (23) provided with inner screw threads (24–26) conjugate with outer screw threads (22) of the nut (12), and in these two series of screw threads complementary axial splines are provided so that the locking cylinder (23) locks the nut (12) against rotation when their screw threads and respective splines are in engagement with each other. The locking cylinder (23) may be controlled by a cable (29). Application in the locking in particular of adjusting devices for table guides of woodworking machines and seat structures of vehicles.

3 Claims, 13 Drawing Sheets

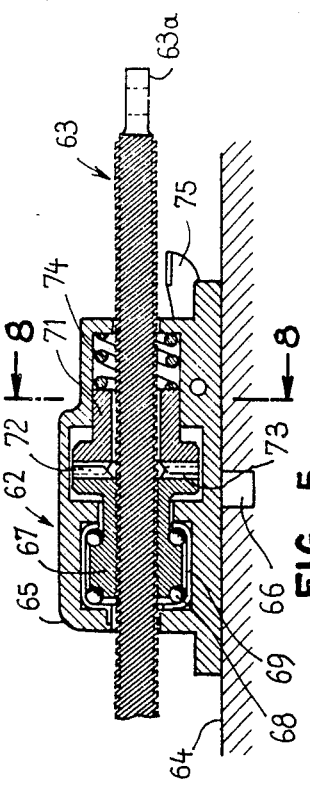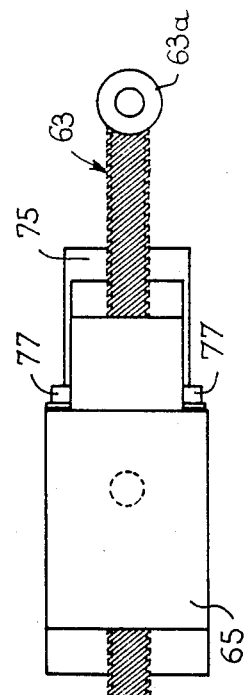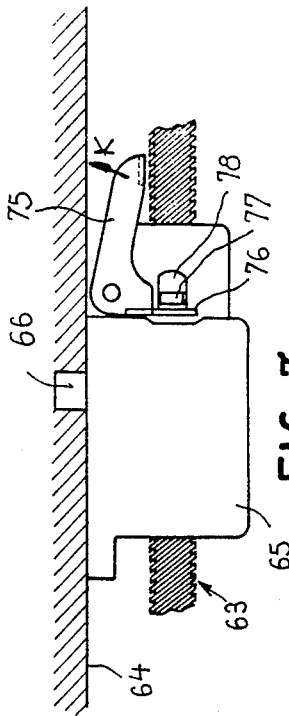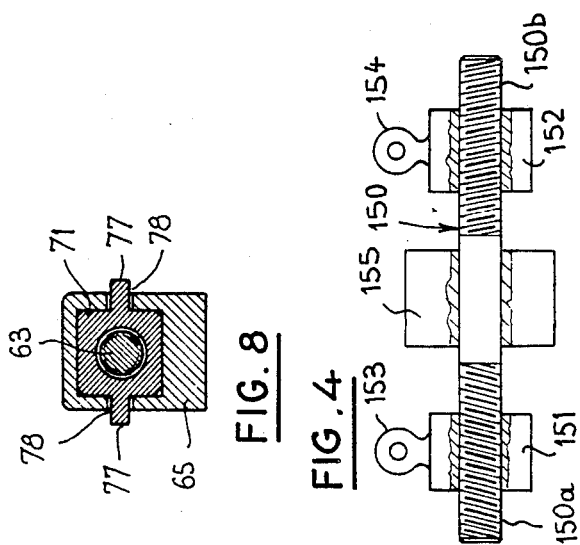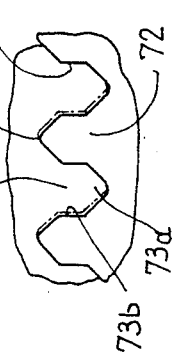

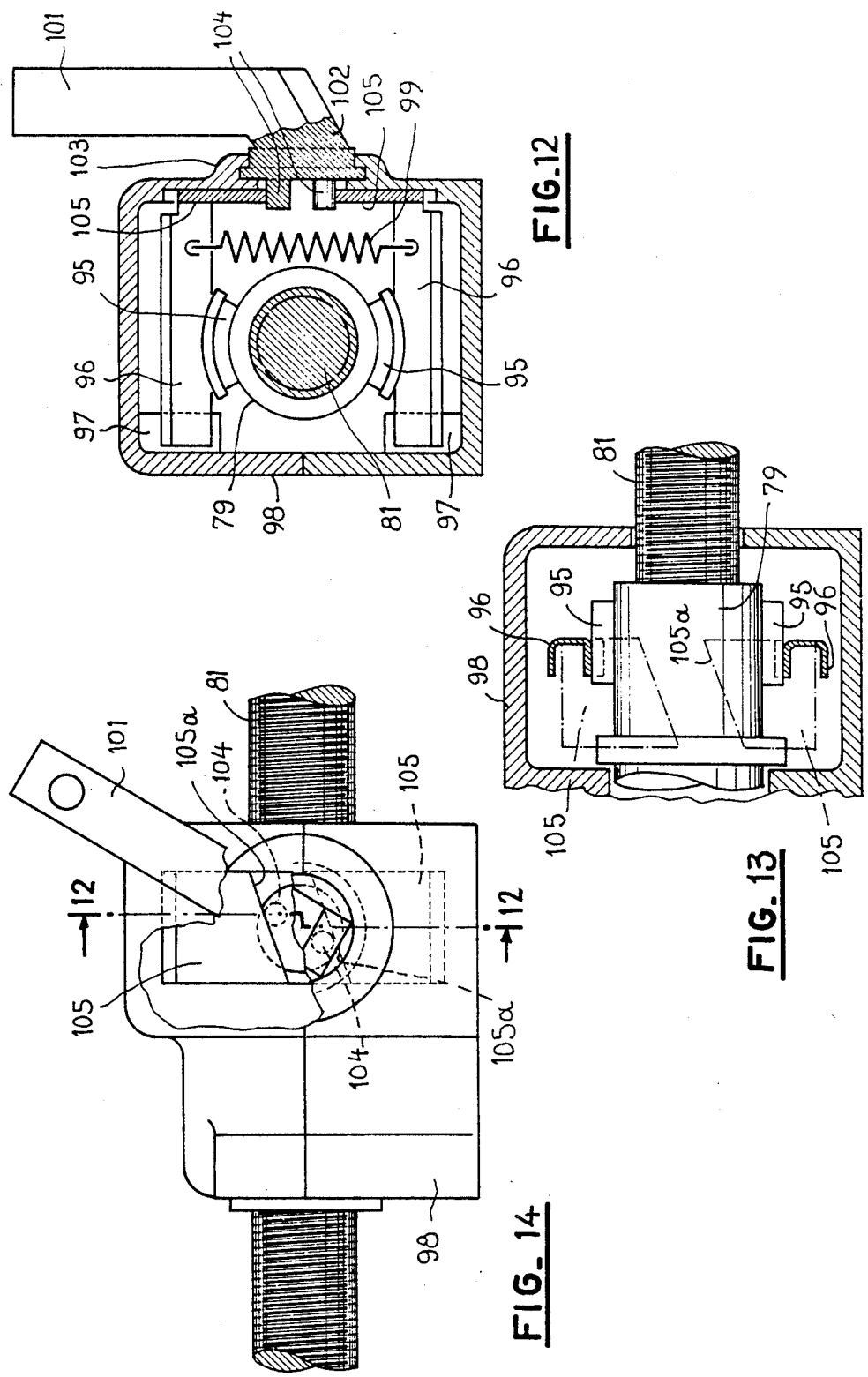

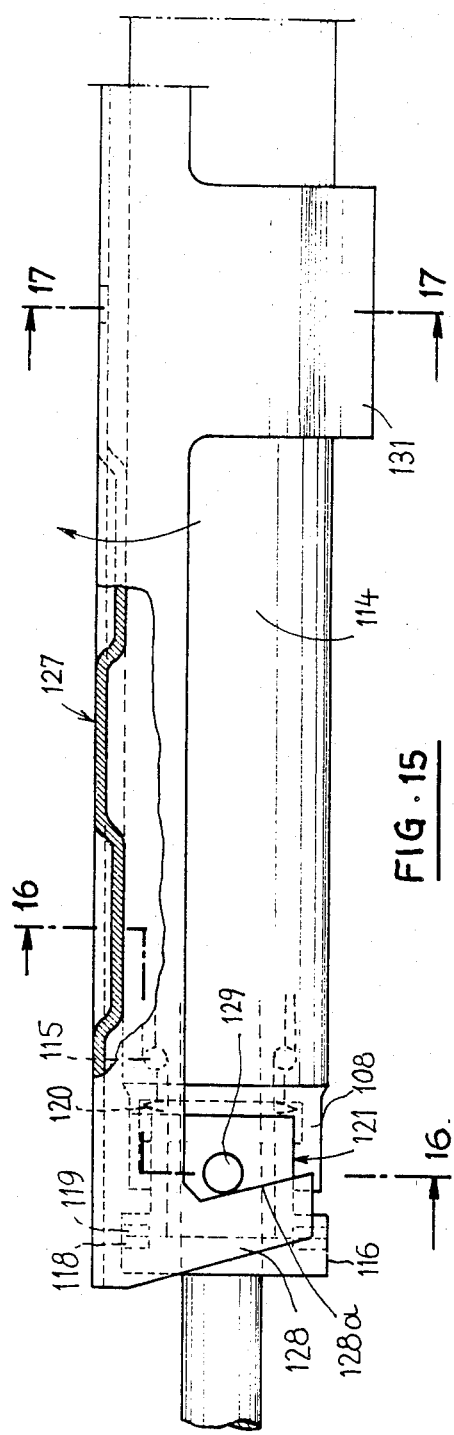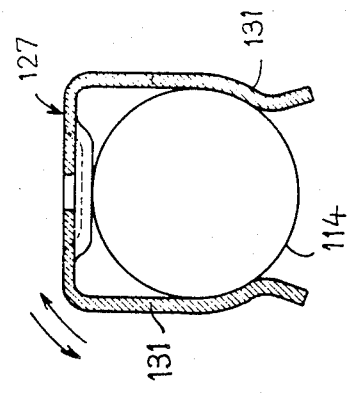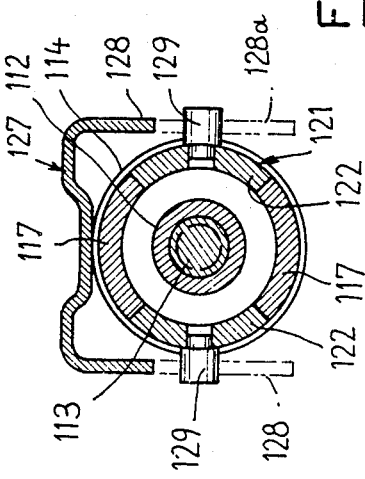

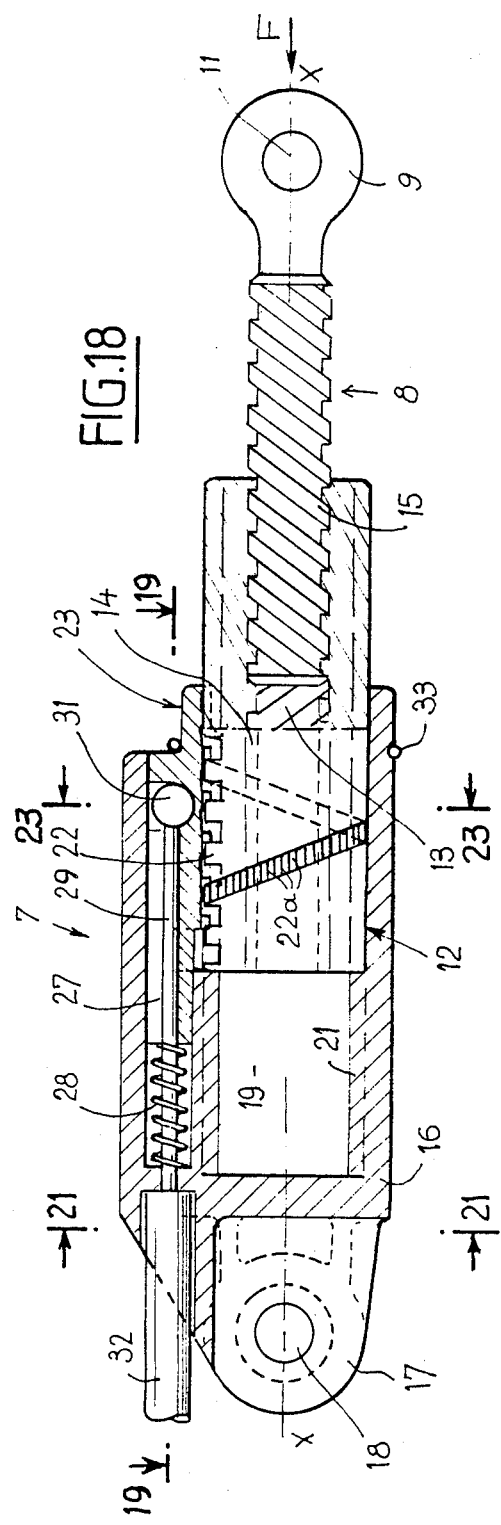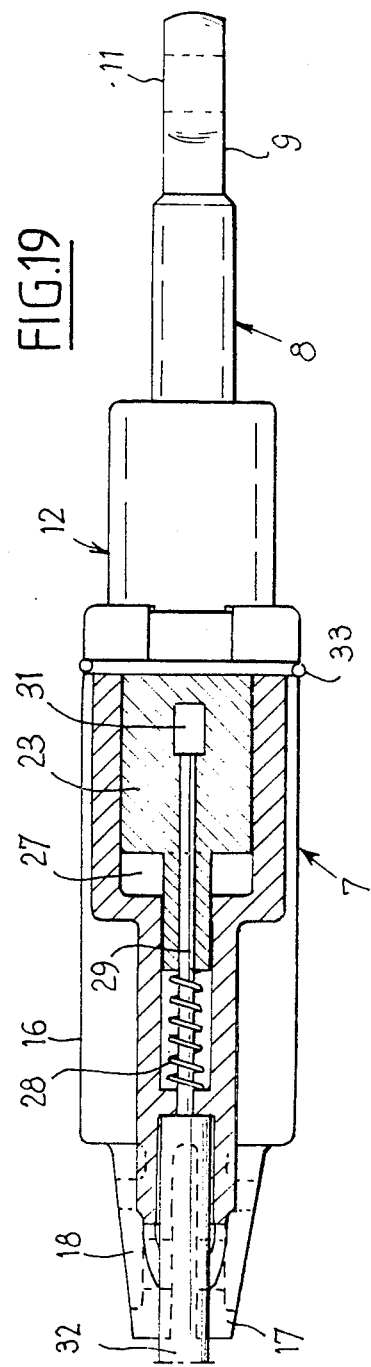

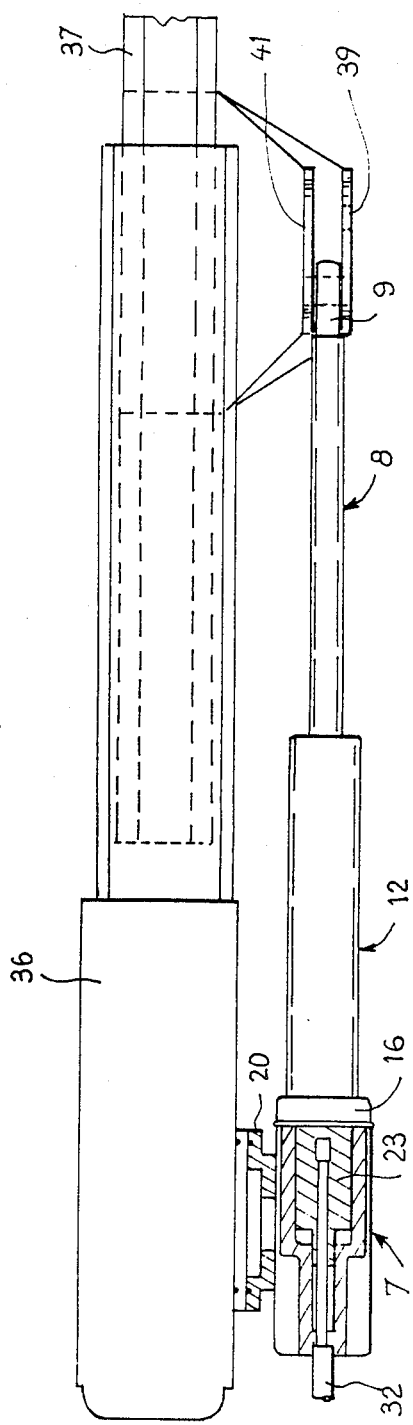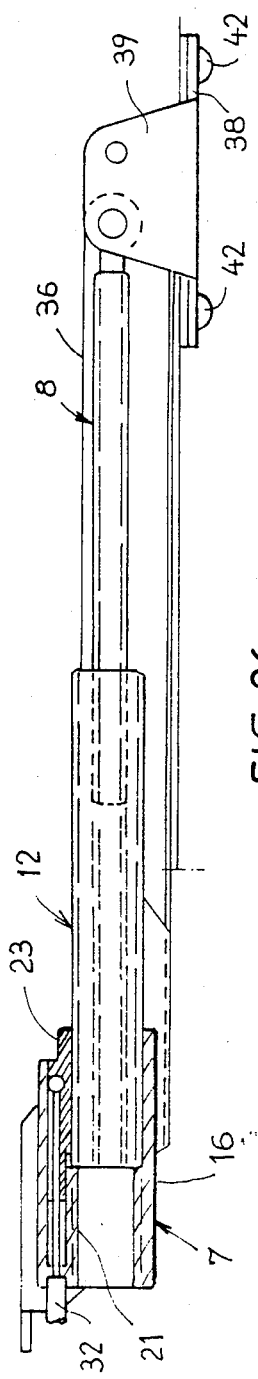
FIG.25
FIG.26

SYSTEM FOR LOCKING A LINEAR DEVICE FOR RAPIDLY ADJUSTING AND IMMOBILIZING A MOVABLE PART RELATIVE TO A FIXED PART

The present invention relates to a system for locking a linear device for rapidly adjusting and immobilizing a movable part relative to a fixed part.

The U.S. patent application Ser. No. 107,605 in the name of the Applicant filed on the same day as the present application and entitled "Linear device for rapidly adjusting and immobilizing a movable part relative to a fixed part, applicable in particular to the adjustment of a table guide of woodworking machines" discloses various embodiments of such a device.

This device constituting a mechanical jack is capable of use in very many applications, for example for adjusting the guide of a table of a woodworking machine, or for adjusting the positions of elements of a seat structure, in particular in a motor vehicle, a boat or an aircraft.

An object of the invention is to provide an advantageous system for locking the rotary element (nut) of the screw-and-nut pair of the rapid adjusting device disclosed in the aforementioned patent application.

The system to which the invention relates is adapted to ensure the locking of a linear device for effecting a rapid adjustment and an immobilization of a movable part relative to a fixed part, this linear device comprising at least one pair of screw-and-nut elements carried by a housing cooperative with the fixed part and movable part, the helix angle of the screw threads thereof being sufficiently large to ensure the efficiency of the translation into the rotation is slightly positive, said system being adapted to be capable of locking the rotary element of the screw-and-nut pair after adjustment of the position of the movable part.

A brief explanation of said efficiency is given in said U.S. patent application Ser. No. 107,605.

According to the invention, the means for locking the nut comprise: a locking portion of a cylinder provided with inner screw threads conjugate with outer screw threads of the nut and, in said two series of screw threads, there are provided complementary splines which are parallel to the axis of the screw, the locking portion of the cylinder being biased by an elastically yieldable element against an element integral with the housing and into engagement with the splines of the nut by preventing the nut from rotating, the device being then at rest, a screw thread being provided in the housing and being similar to the screw threads of the nut so that the nut is capable of rotating in the screw thread of the housing by travelling axially in the housing and in the screw threads of the locking member when the locking cylinder is not engaged with the nut, and means for manually permitting an axial displacement of the locking cylinder for disengaging it from the splines of the nut and unlocking the nut so as to allow it to rotate in the screw thread of the housing.

The construction and the actuation of this locking system are particularly simple and easy.

Further features an advantages of the invention will appear from the following description with reference to the accompanying drawings which illustrate by way of a non-limiting example one embodiment of the invention:

FIGS. 1 to 4 are simplified semi-axial sectional and semi-elevational views of four embodiments of the linear adjusting device in which the locking system according to the invention may be incorporated;

FIG. 5 is an axial sectional view of a device of the type shown in FIG. 1, provided with a first embodiment of a locking system of known type;

FIGS. 6 and 7 are respectively a top plan view and a side view of the device of FIG. 5;

FIG. 8 is a cross-sectional view taken on line 8—8 of FIG. 5;

FIG. 9 is a partial plan view to an enlarged scale of a detail of the locking system of the device of FIGS. 5 to 9;

FIG. 12 is a cross-sectional view taken on line 12—12 of FIG. 14 of an adjusting device of the type of that shown in FIG. 1 provided with another locking system;

FIG. 13 is an axial semi-sectional view and a semi-elevational view with a part cut away of the device of FIG. 12;

FIG. 14 is a longitudinal elevational view with a part cut away of the device of FIGS. 12 and 13 and its locking system;

FIG. 15 is a longitudinal elevational view and a partial sectional view of another locking system of known type of the rapid adjusting device;

Figure 1:
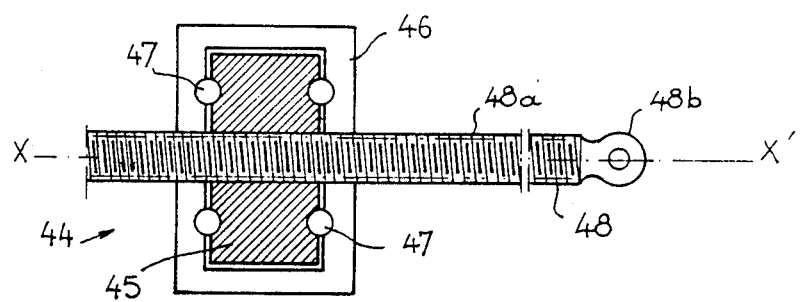
Figure 2:
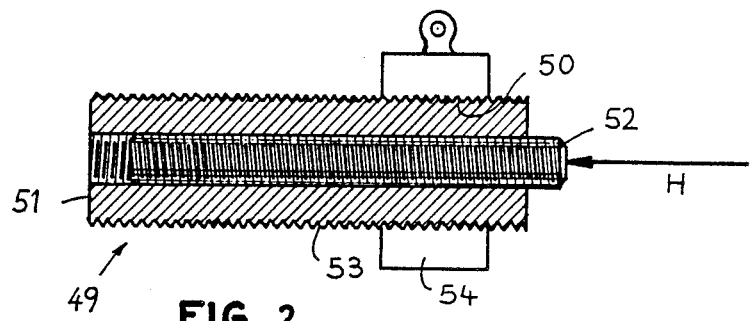
Figure 3:
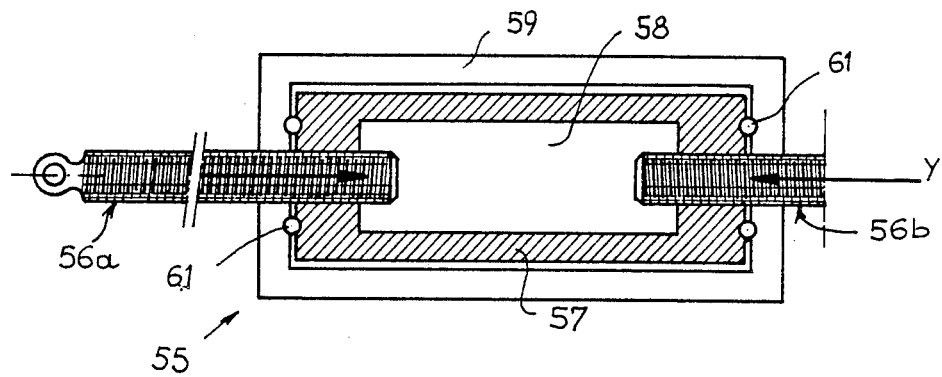
Figure 20:
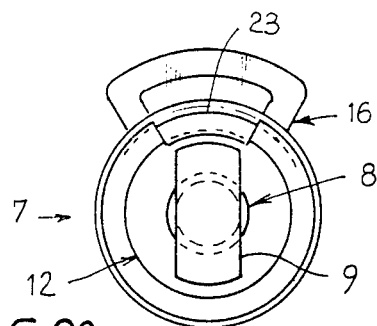
Figure 21:
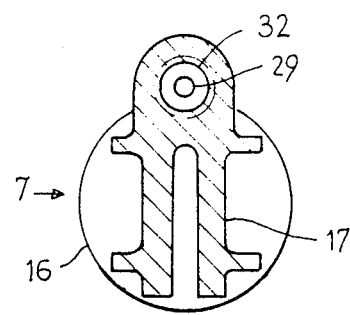
Figure 22:
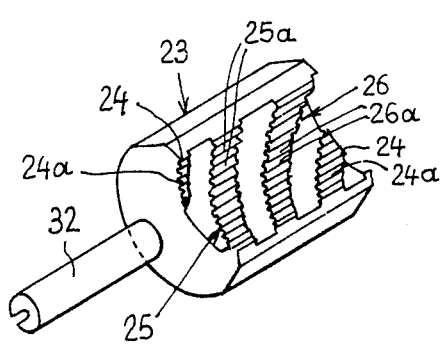
Figure 23:
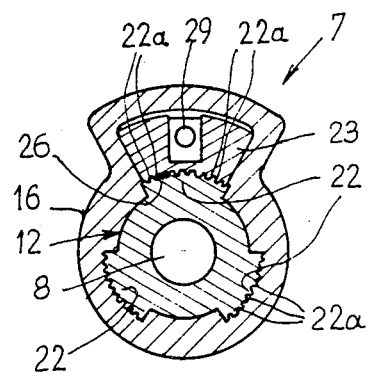
Figure 27:
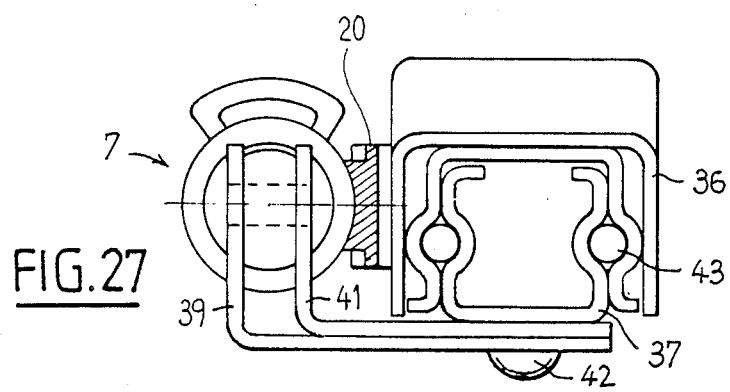
Figure 24:
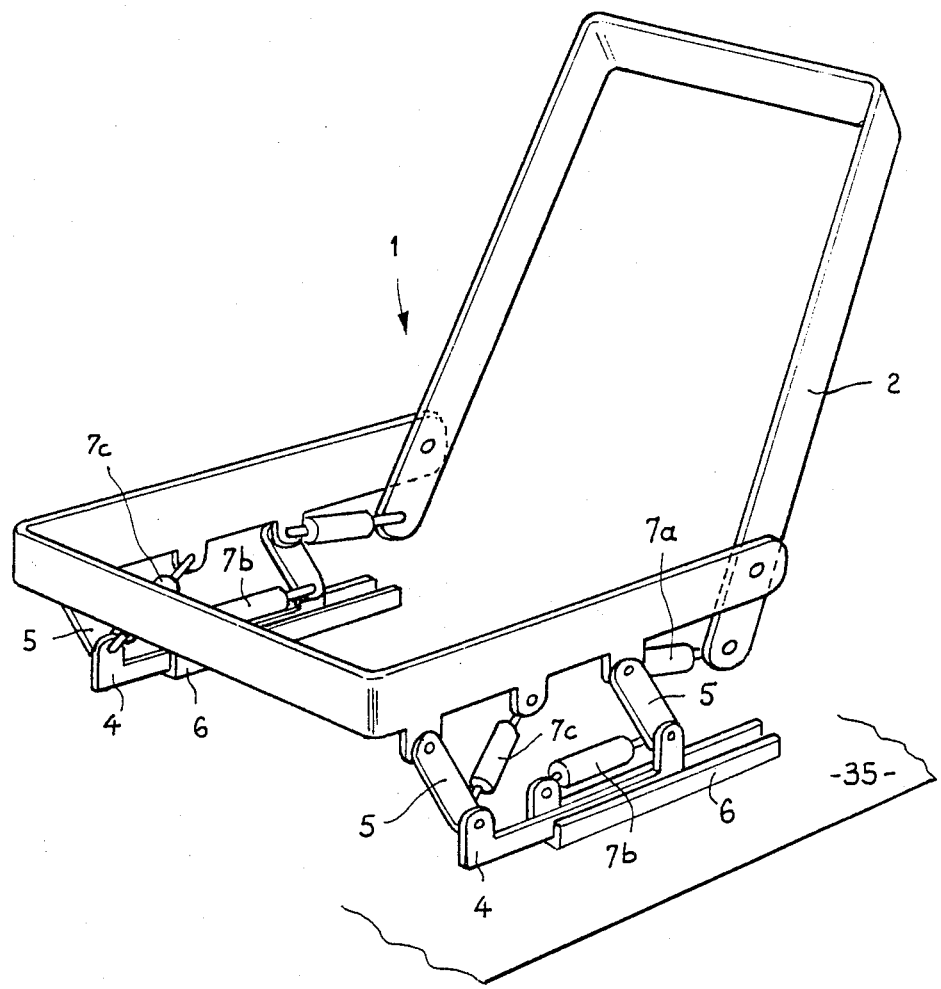
Figure 28:
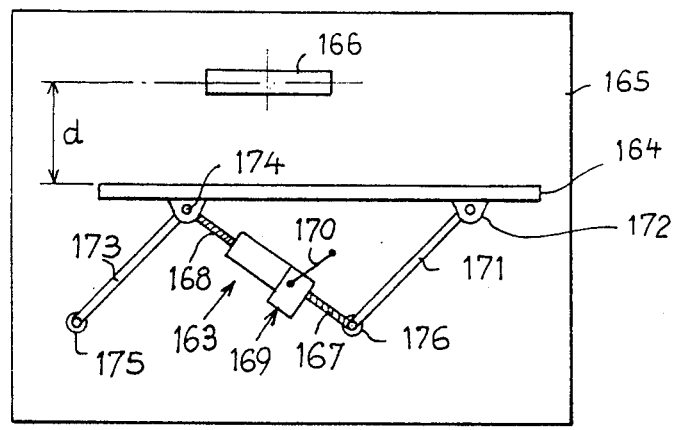
Figure 29:
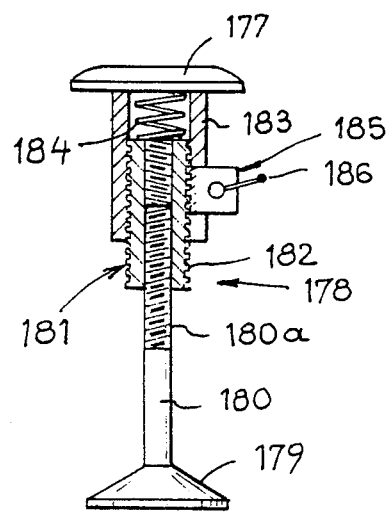
Figure 30:
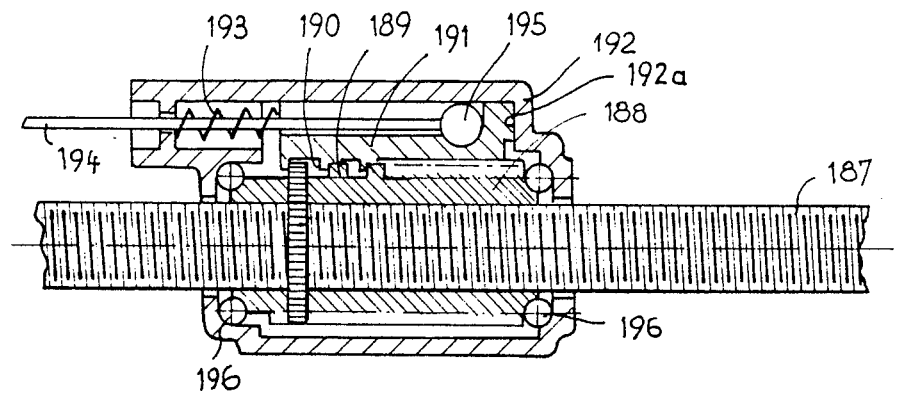
Figure 31:
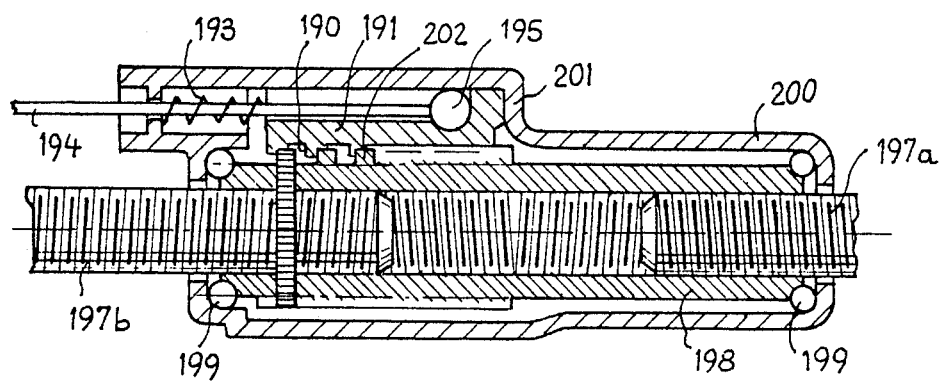

FIG. 16 a cross-sectional view taken on line 16—16 of FIG. 15;

FIG. 17 is a cross-sectional view taken on line 17—17 of FIG. 15;

FIG. 18 is an axial sectional view of a rapid adjusting device of the type of that shown in FIG. 2 provided with an embodiment of the locking system according to the invention;

FIG. 19 is a longitudinal sectional view taken on line 19—19 of FIG. 18;

FIG. 20 is an end elevational view of the device in the direction of arrow F of FIG. 18;

FIG. 21 is a cross-sectional view taken on line 21—21 of FIG. 18;

FIG. 2 a perspective view of a locking cylinder portion permitting the locking of the block of the adjusting device of FIGS. 18 to 21 against rotation;

FIG. 23 is a cross-sectional view taken on line 23—23 of FIG. 18;

FIG. 24 is a simplified perspective view of the framework of a vehicle seat structure provided with several linear adjusting devices;

FIGS. 25 and 26 are respectively a top plan view and a longitudinal elevational view illustrating the placement of the adjusting device of FIGS. 18 to 24, and its locking system according to the invention on a vehicle seat structure for the longitudinal adjustment of the seat of this seat structure;

FIG. 27 is an end elevational view, with a partial sectional view, of the device of FIGS. 25 and 26;

FIG. 28 is a top plan view of a table of a woodworking machine for the adjustment of its guide by means of a rapid adjusting device;

FIG. 29 is a vertical axial sectional view of a stool which is adjustable in height by means of a rapid adjusting device;

FIGS. 30 and 31 are axial sectional views of the application of the locking system of FIGS. 18 to 23, respectively in respect of the rapid adjusting device of FIG. 1 and of FIG. 3.

FIG. 1 shows a first embodiment of the linear device for the rapid adjustment of a movable part relative to a fixed part (not shown). This device comprises a screw 48 which extends through a nut 45 disposed in a cavity of a housing 46 with interposition of rolling bearings 47.

The bore of the nut 45 is provided with a tapped screw thread engaged with the screw thread 48a of the screw 48 and the nut 45 is prevented from axially moving inside the housing 46. It is therefore movable solely in rotation about the axis X-X' of the screw 48, which is movable in translation and prevented from rotating. The screw 48 comprises an end eye 48b for rendering it integral with the movable part to be adjusted and the housing 46 is integral with the fixed part. The angle of the screw 48, i.e. the angle of inclination of its screw threads relative to a perpendicular to the axis X-X' (also termed helix angle or thread angle) is so chosen as to be sufficiently large to ensure that the efficiency of the translation of the screw 48 into the rotation of the nut 45 is slightly positive. The device may be provided with a locking system (not shown) for locking the nut 45 against rotation and consequently locking the screw 48 against translation when the latter is in the position corresponding to the desired adjustment for the movable part. An axial thrust on the screw 48 in either direction results, in this device, solely in a rotation of the nut 45 in its housing 46.

In the second embodiment of the device illustrated in FIG. 2, the device 49 comprises a screw 52 which is movable in translation and prevented from rotating, a nut 51 having a tapped bore cooperative with the screw thread of the screw and an outer screw thread 53 whose hand is the opposite of that of the screw thread of the tapped bore through which the screw 52 extends. The nut 51 extends through a block 54 provided with a tapped bore 50 and capable of being rendered integral with the fixed part (not shown) to be adjusted while the screw 52 is integral with the movable part. Consequently, the nut 51 is movable in both translation and rotation when an axial force H is exerted on the screw 52 by the movable part. The block 54 is capable of carrying a locking system (not shown) for the nut 51. As in the preceding embodiment, the angle of the screw 52 is so chosen as to be sufficiently large to ensure that the efficiency of the translation into the rotation is slightly positive.

FIG. 3 illustrates a further embodiment of the adjusting device in which the latter comprises a nut 57 having an inner cavity 58 and in the ends of which are arranged two tapped bores whose screw threads have opposite hands and are each cooperative with a screw 56a, 56b, these two screws having opposite hands. The nut 57 is rotatively mounted in a support housing 59 through which the screws 56a, 56b also extend. As the helix angle of the threads of the latter are chosen to ensure that the efficiency of the translation into the rotation is slightly positive and one of the screws 56a, 56b is integral with the movable part (not shown) to be adjusted, while the other screw is integral with the fixed part, the nut 57 is movable both in rotation and in translation under the action of an axial force such as Y exerted on the screw integral with the movable part. It will be understood that the housing 59 accompanies the movement in translation of the nut 57. The housing 59 may be provided with means (not shown) for locking the nut 57 and consequently the screw connected to the movable part.

In the fourth embodiment illustrated in FIG. 4, the adjusting device comprises a screw 150 carrying two screw threads 150a, 150b having opposite hands and each cooperative with a nut 151, 152, one of which nuts is connected to the fixed part whereas the other is connected to the movable part to be adjusted by respective eyes 153, 154. The screw 150 extends through a housing 155 which may be provided with means for locking the screw 150. A force exerted in a direction parallel to the axis of the screw 150 on the nut (153 or 154) which is movable in translation from the movable part moves the screw 150 in both translation and rotation.

In the embodiment illustrated in FIGS. 5 to 9, the adjusting device or mechanical jack 62 is of the type of that shown in FIG. 1 and comprises a screw 63 whose end 63a is adapted to be articulated to a part to be adjusted, which is movable relative to a fixed support 64 of the device 62. The screw 63 extends throughout the housing 65 which is mounted on the support 64 to be pivotable about a pivot 66. The pivot 66 is perpendicular to the axis of the screw 63 so as to permit the pivoting of the whole of the device 62 about the pivot 66 for accompanying the displacements of the part to be adjusted.

The screw 63 also extends axially through a nut 67 disposed within the housing 65 and fixed in translation and guided in rotation by ball bearings 68 which are retained by a sleeve 69. The nut 67 is maintained locked against rotation, when the device is at rest, by a locking member 71 through which the screw 63 extends and which carries radial teeth or dogs 72 capable of coming into engagement with corresponding dogs 73 of the nut 67 under the effect of a thrust exerted by a spring 74 disposed in the housing 65 coaxially with the screw 63 and bearing against the end wall of this housing. The nut 67 may be unlocked by a lever 75 which is mounted on the housing 65 to pivot about an axis transverse to the housing and which is provided with lateral ears 76 capable of driving in axial translation two pins 77 integral with the locking member 71, and projecting laterally through the wall of the housing 65 in corresponding openings 78.

Thus, when the lever 75 is pivoted in the direction of arrow K (FIG. 18), the ears 76 cause the sliding of the pins 77 and the locking member 71 around the screw 63 in the direction which moves the locking member 71 away from the nut 67, which disengages the dogs 72 from the dogs 73 and renders the nut 67 free to rotate.

It will be observed in FIG. 9 that the teeth or dogs 72, 73 have pointed end portions 72a, 73a which are complementary and laterally extended by flat surfaces 72b, 73b which prevent any natural disengagement of the dogs from each other.

The nut 67 may be unlocked by shifting the lever 75 against the action of the return force exerted by the spring 74, which automatically puts the locking member 71 back into engagement with the nut 67 and stops the latter from rotating as soon as the lever 75 is released.

This type of locking with dogs may withstand great forces but the realization of a fine adjustment in a reduced overall size is difficult.

Figure 10:
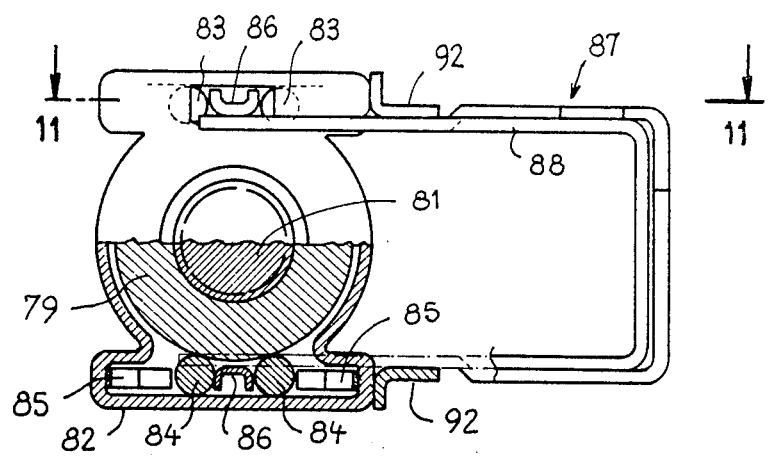
FIG. 10 is a partial-elevational view and partial-sectional view taken on line 10—10 of FIG. 11, of a rapid adjusting device of the type shown in FIG. 1 provided with a second embodiment of the locking system, which is of known type.
Figure 11:
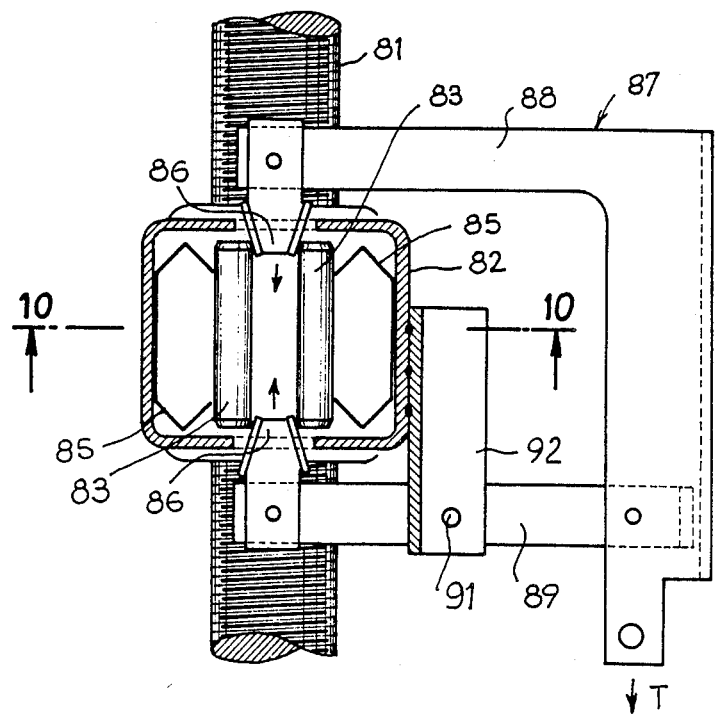
FIG. 11 is a plan view and a partial sectional view taken on line 11—11 of FIG. 10.

The embodiment shown in FIGS. 10 and 11 shows an adjusting device of the type of that shown in FIG. 1 provided with known means for unlocking the nut 79 and allowing it to rotate, a screw 81 extending through this nut. These means comprise, disposed in a diametrically opposed manner on each side of the nut 79 between the latter and the longitudinal walls of a housing 82, two pairs of parallel rollers 83, 84 which are elastically biased against the nut 79 by spring strips 85 which bear against the wall of the housing 82 so as to prevent the nut 79 from rotating.

The device further comprises wedges 86 engaged between the opposed ends of the rollers 83, 84, and means for advancing the wedges 86 between the rollers so as to move them away from each other and thus unlock the nut 79, or retracting these wedges 86 for locking the nut 79. In the embodiment illustrated in FIGS. 10 and 11, these means comprise a tongs 87 formed by two jaws 88, 89, the jaw 88 having an L shape and the jaw 89 being articulated to one end of the jaw 88. Each end of the jaws 88, 89 carries a wedge 86, and the jaw 89 is moreover articulated at 91 to an element 92 fixed outside the housing 82, for example by welding.

When this locking system is at rest as illustrated in FIG. 11, the springs 85 apply the rollers 83, 84 against the nut 79 which is prevented from rotating. If there is now exerted on the jaw 88 a force T in a direction parallel to the axis of the screw 81, the whole of the jaw 88 is shifted in the direction of the force T parallel to the screw 81 so that the wedge 86 of the jaw 88 is forced between the rollers 83. At the same time, the jaw 89 pivots about its fixed articulation 91, so that the associated wedge 86 also enters between the rollers 83, 84. The latter are moved away from the nut 79, in opposition to the action of the return force exerted by the springs 85, and the nut 79 is allowed to rotate.

This locking system employing a wedging action has the drawback of developing radial forces on the housing which are much too large.

The device for controlling the unlocking of the nut 79 of the mechanical jack, also of the type of that shown in FIG. 1, represented in FIGS. 12 to 14, is known per se. It comprises a pair of jaws 95 respectively integral with a section member 96 and capable of moving away from the nut 79 by sliding on inner guides 97 inside the housing 98. The jaws 95 have a curvature equal to that of the cylindrical nut 79, so as to be capable of being applied against the latter under the action of a spring 99, and are capable of being moved away from the nut 79 by the rotation of a lever 101 which has a cranked end 102 rotatively engaged in a projection 103 on the wall of the housing 98. The end 102 carries two pins 104 each in contact with a plate 105 integral with an end of the corresponding section member 96. Each plate 105 has an edge 105a which is inclined relative to the axis of the screw 81 and in contact with the corresponding pin 104. At rest, the spring 99 maintains the jaws 95 applied against the surface of the nut 79 which is in this way locked against rotation. When the lever 101 is lowered, the pins 104 exert on the respective plates 105 forces in opposite directions which move the jaws 95 away from each other, so that the nut 99 is unlocked and is free to rotate.

In the same way as the wedging system, this locking system employing jaws has the disadvantage of subjecting the housing to radial forces which are much too large.

FIGS. 15 to 17 represent another embodiment of the adjusting device, one half of the latter only being shown in FIG. 15, and the second half being symmetrical to the first half relative to a median transverse plane. This device is the type of that shown in FIG. 3 and comprises a nut 112 through which extends a screw 113 and which is disposed in a housing 114, this nut being guided in rotation by ball bearings 115. The end 116 of the nut 112 axially projects outside the housing 114 and includes two identical cylindrical sectors 116 which extend axially between the end of the housing 114 and the end part 116. On the side thereof facing the housing 114, this end part 116 is provided with a set of teeth 18 in which is engageable a complementary set of teeth 119 of a dog 121 constituted by two sectors 122 which are complementary to the sectors 117 between which they are slidable.

The dog 121 is subjected to the action of an elastically yieldable element 120 which bears against the end of the housing 114 and biases the dog 121 axially so that its set of teeth engage with the set of teeth 118 which normally maintains the latter locked against rotation.

The device controlling the unlocking of the nut 112 comprises, in the known manner, for each of the two screws 113, a member 127 constituted for example by a press-formed sheet of metal which partly surrounds the housing 114. Each member 127 is provided at the end thereof in facing relation to the dog 121, with two lateral wings 128 each having an edge 128 which is inclined relative to a plane perpendicular to the axis of the screw 113, and in contact with a lateral pin 129 extending laterally from the dog 121. At the end thereof opposed to the wings 128, the sheet of metal 127 is provided with two lateral extensions 131 applied against the housing 114 and permitting the manual holding of the sheet 127 for causing it to pivot about the housing 114.

As the elastically yieldable element 120 tends to maintain the dog 121 in engagement with the set of teeth 119, a rotation of the sheet 127 in the direction of the arrow shown in FIG. 15 by means of the extensions 131, causes the wings 128 to rotate so that their edges 128a exert on the pins 129 a force which causes the axial retraction of the dog 121 against the effect of the force exerted by the return spring 120, which unlocks the nut 112. Inversely, when the control member 127 is released, the pressure exerted by the spring 120 on the dog 121 causes, by means of the pins 129, the return of the sheet 127 to its initial position and the locking of the nut 112.

This locking system employing dogs has the same drawbacks as that of FIGS. 5 to 9.

Description of the embodiment shown in FIGS. 18 to 23

The mechanical jack 7 comprises a screw 8 having one end 9 provided with an aperture 11 so as to be articulated to the movable part to be adjusted or to the fixed part, and a nut 12 provided with an axial cavity 13 having a tapped bore 14 adapted to cooperate with the screw thread 15 of the screw 8. The nut 12 is disposed in a housing or body 16 which is rendered integral with one of the fixed and movable parts by an end ear 17 provided with an aperture 18.

Provided in the housing 16 is an axial cavity 19 receiving the nut 12, and the wall of the cavity 19 has a screw thread 21 adapted to cooperate with complementary screw threads 22 of the nut 12 formed on the outside of the latter so as to permit the nut 12 to rotate inside the housing 16 about the general axis X—X of the mechanical jack 7 under conditions which will be explained hereinafter. In the presently-described embodiment, the threads 22 are triple threads or three-start threads.

Furthermore, the device 7 is provided with means for locking and unlocking the nut 12 in accordance with the invention whereby it is possible to prevent the rotation of the nut and consequently the movement of the screw 8 in translation or, on the contrary, to release the nut 12 for rotation and thus permit an axial translation of the screw 8 inside the nut 12. Indeed, as the screw 8 is articulated by its end 9 to a movable or fixed part, it cannot rotate about its axis X—X so that, when the screw 8 is subjected to an axial force F, it can only move in axial translation in the nut 12 when the latter is free to rotate.

In the presently-described embodiment, these means for locking the nut 12 comprise : a locking cylinder portion 23 provided with inner screw threads 24, 25, 26 conjugate with screw threads 22 of the nut 12 (which is therefore also a triple thread in this example) and in these two series of threads 22–26, there are provided respectively splines 22a; 24a, 25a, 26a which are complementary and parallel to the axis X—X. The locking cylinder 23 is disposed in a longitudinal compartment 27 in the housing 16 and extends in a direction parallel to the cavity 19. Furthermore, the inner screw thread 21 is interrupted in an angular sector equal to that occupied by the locking cylinder portion 23, as can be seen in FIG. 23. Consequently, if the locking cylinder 23 is, in an axial position which is such that its screw threads 24–26 are in the radial extension of the screw threads 21, the screw threads 24–26 form with the screw threads 21 a single screw threading. This therefore allows the rotation of the nut 12 and its axial displacement in the housing 16 by cooperation of its screw threads 22 with the screw thread 21 which is put in phase with the screw threads 24–26.

The locking member 23 is biased by an elastically yieldable element 28 constituted by a coil spring coaxial with a cable 29 whose end is rendered integral with the locking member 23 by a stop 31 disposed in a corresponding cavity of the locking member 23. The cable 29 extends therefore in the compartment 27 and through the body 16 and is contained in a sheath 32 outside the body 16. The cable 29 is provided at the end thereof opposed to the stop 31 with a control element (not shown), for example a manual handle. The spring 28 bears against an end wall of the compartment 27 and exerts on an end of the locking member 23 a thrust which is substantially parallel to the axis X—X and tends to maintain the locking member 23 in axial abutment against a retaining means such as ring 33 partly engaged in a corresponding groove in the periphery of the housing 16.

The cavity 27 is so dimensioned as to allow reciprocating axial movements of the locking member 23 and to guide by its walls these movements (FIG. 19).

The adjusting device 7 operates in the following manner:

With the screw 8 articulated by its end 9 to a movable part to be adjusted and the housing 16 articulated by its end 17 to a part which is fixed relative to the movable part (or inversely), and the jack 7 being at rest, the thrust exerted by the spring 28 on the locking member 23 maintains the latter in abutting relation to the ring 33 in an axial position in which its screw threads 24–26 are offset relative to the screw thread 21 by 1/6 of the total pitch or lead of the threads 21. Consequently, the threads 24–26 are engaged with the threads 22 by the putting together of their complementary splines 22a and 24a–26a respectively. Thus, the nut 12 is locked against rotation in the housing 16 and an axial thrust F exerted on the screw 6 does not enable the latter to effect an axial translation in the nut 12 and the screw 8 therefore remains immobilized.

If it is now desired to adjust the position of the movable part to which the screw 8 (or the body 16) is articulated, a pull is exerted on the cable 29 in opposition to the return force exerted by the spring 28. This pull is transmitted through the stop 31 to the locking member 23 which moves rearwardly in its compartment 27 so that the screw threads 24–26 and their splines 24a–26a are disengaged from the screw threads 22. At the end of this axial retraction of the locking member 23, the screw threads 24–26 come to be placed in the radial extension of the threads of the screw threading 21 which they complete and form a single screw threading enabling the nut to rotate freely in the housing 16. Thus, after the unlocking of the nut 12, an axial thrust F exerted on the screw 8 results in a double movement: the screw 8 causes the rotation of the nut 12 into which it travels by cooperation of the screw threads 14 and 15 and the nut effects an axial translation in the housing 16 into which it travels.

It will be understood that if an axial thrust opposed to the thrust F is exerted on the screw 8, this causes relative movements which are the inverse of the preceding movements of the elements 8 and 12. When the movable part has reached the desired position, the control cable 29 is released so that the spring 28 returns the locking member 23 to its initial position. Its screw threads 24–26 thus again come into engagement with the screw threads 22 by the fitting together of the splines 22a and 24a–26a which again locks the nut 12 against rotation and the screw 8 against translation. The axial displacements of the locking member 23 are guided by the longitudinal walls of the cavity 27 (FIG. 3) and likewise the displacements of the cable 29 are guided by a corresponding cavity in the surface of the locking member 23.

Applications of the rapid linear adjusting device or mechanical jack

FIG. 24 illustrates an example of an application of the rapid adjusting device in the adjustment of the component elements of a seat structure which may be that of a vehicle (automobile, aircraft, boat) or of any fixed installation.

This seat structure comprises a framework 1 constituted by a frame 2 of the backrest, a seat 3 to which is articulated the frame 2, two slides 4 each connected to the seat 3 by two links 5 articulated to the seat 3 and to the slides 4, the latter being slidably mounted in slideways 6 fixed to the floor 35.

The framework 1 is equipped with a plurality of linear adjusting devices constituting as many mechanical jacks permitting the adjustment of the three component elements of the seat structure : two jacks 7a are articulated on one hand to the lower ends of the frame 2 and to the seat 3 to permit the adjustment of the inclination of the frame 2 and therefore of the backrest, two jacks 7b are articulated on one hand to the fixed slideways 6, and on the other hand to the movable slides 4, so as to permit the adjustment of the longitudinal position of the seat 3 relative to the floor, and two jacks 7c are articulated on one hand to the movable slides 4 and on the other hand to the seat 3, to permit the adjustment of the height of the latter.

The housings of the jacks 7a are articulated to the seat 3 to pivot about an axis perpendicular to the screw so as to be pivotable about this axis for the purpose of following the angular movements of the backrest 2 to which the screw is articulated. Inversely, the latter may be articulated to the seat 3 and the housing to the frame of the backrest 2.

The housings of the jacks 7c are adapted to be articulated to the slides 4 integral with the seat 3 and which are slidable in the fixed slideways 6, whereas the screws are articulated to the seat 3 so as to permit the adjustment of the height of the seat 3 relative to the floor 35. It will be understood that this arrangement may be inverted, the screws being articulated to the slides 4 and the housings articulated to the seat 3.

The housings of the jacks 7b may be rendered integral with the fixed slideways 6 and the screws may be rendered integral with the seat 3 to permit the longitudinal adjustment of the latter. Inversely, the screws may be rendered integral with the fixed slideways 6 while the housings are rendered integral with the seat 3.

FIGS. 25 to 27 illustrate the placement of an adjusting device 7 which conforms to the embodiment shown in FIGS. 18 to 23, by an attachment 20 on a slide 36 which is slidable on a slideway 37 fixed to a floor, for example of a vehicle, for the adjustment of the longitudinal position of the seat (not shown) of the seat structure, the jack 7 being positioned in the front of the seat structure. The screw 8 is shown in its position in which it is extended to the maximum extent out of the nut 12, the latter being in its position in which it is extended to the maximum extent out of the housing 16. The end 9 of this screw is articulated to two section members 39, 41 which are rendered integral with the fixed slideway 37, for example by rivets 42. Rolling bearings 43 are conventionally interposed between the slide 36 and slideway 37.

FIG. 28 illustrates the application of a device 163 in the adjustment of a guide 164 of a table 165 of a woodworking machine provided for example with a circular saw, a shaper or a planer, etc.. Up to the present time, the guide 164 was adjusted in position by a system comprising a slot and employing a clamping by means of a nut which is advantageously replaced by the device 163. The latter is of the type shown in FIG. 3, and therefore has two screws 167, 168 and includes a locking system 169 with a manual actuating lever 170. The screw 167 is articulated to a link 171 which is articulated at its opposite end to an ear 172 of the guide 164. The screw 168 and a second link 173 are articulated to a second ear 174 of the guide 164, the opposite end of the link 173 being mounted to pivot about a fixed pivot 175, the pivot 176 of the articulation of the screw 167 and the link 171 being also fixed to the table 175

The articulation points 172, 174, 175 and 176 constitute the corners of a parallelogram structure of which two corners 175 and 176 are fixed, the other two corners being movable when the system 179 is unlocked. It is indeed then possible to pivot the links 171 and 173 which permits the displacement of the guide 164 while maintaining it parallel to itself, and the variation of the dimension d between the guide and the circular saw 166, the diagonal of the parallelogram structure varying in the course of this displacement.

The locking system 169 is adapted to be capable of preventing the rotation of the nut associated with the rods 167, 168, this nut being suitably provided with an outer screw thread capable of engaging with that of the locking system 169.

FIG. 29 shows the application of the rapid adjusting device in the adjustment in height of the seat 177 of a stool 178 whose foot is constituted by a disc 179 bearing against the ground, and a screw 180. The latter is part of an adjusting device of the type of that shown in FIG. 2 which comprises consequently a nut 181 having a tapped bore which cooperates with the screwed thread 180a of the screw 108, and a screw thread 182 cooperative with the tapped bore of a housing 183 carrying the seat 177 at its upper end. A spring 184 is disposed in the housing 183 and bears against the nut 181 and exerts on the seat 177 an upward vertical thrust. The device is completed by a locking system 185 adapted to prevent rotation of the nut 181.

In order to adjust the height of the seat 177, the housing 183 is unlocked relative to the nut 181 by shifting the lever 186 of the locking system 185. Consequently, the spring 184 upwardly biases the seat 177 and the housing 183 which drives the nut 181 in the rising direction since the efficiency of the system constituted by the screw threaded nut 181 and the tapped housing 183 is reversible. As the foot 179, 180 remains fixed, the seat 177 therefore travels upwardly to the extent of the pitch or lead of the seat relative to the nut 181 plus the pitch or lead of the latter relative to the screw 180. Consequently, if the two aforementioned pitches or leads are equal, the seat 177 travels at twice the velocity of the nut 181. The seat 177 and the whole of the device are locked in the chosen position by actuating the locking system 185, which stops the rotation of the nut 181. The locking system 185 comprises a shoe provided with a tapped portion which cooperates with the screw thread 182 and is capable of being moved away from the latter by the manual lever 186.

In these various embodiments and applications, the rapid adjusting device permits the locking of the movable part in the chosen position by a relatively small force compared to those to which the device is subjected.

The locking system of FIGS. 18 to 23 is applied in this example to a rapid adjusting device of the type of that shown in FIG. 2. But it is also applicable to the devices of the type of those shown in FIGS. 1, 3 and 4.

FIG. 30 illustrates therefore the application of this locking system in a device of the type shown in FIG. 1:

The screw 187 extends through a nut 188 which has a tapped bore and is provided with an outer screw thread 189 whose helix angle is zero and is splined axially, the splines being capable of cooperating with the complementary splines of the screw threads 190 of a cylindrical locking member 191. The latter and the nut 198 are disposed in a body or housing 192 on the end 192a of which the locking member 191 is biased by a spring 193 coaxial with a cable 194 provided with an end stop 195 disposed in a cavity in the locking member 191. The nut 188 is mounted in the housing 192 on ball bearings 196.

FIG. 31 shows a rapid adjusting device having two screws 197a, 197b associated with a common nut 198 mounted on ball bearings 199 in a housing 200 which has a projection 201 acting as an abutment for the locking member 191 which is biased by the spring 193 inside the housing 200. The locking member 191, which is similar to that of FIG. 30, is provided with an inner screw thread 190 which is axially splined and cooperates with a splined outer screw thread 202 on the nut 198, the inclination of the threads 202 being zero.

The operation of the locking systems shown in FIGS. 30 and 31 is similar to that shown in FIGS. 18 to 23.

In the case of FIG. 4, the housing 155 is then tapped and receives the locking cylinder and the central portion of the screw 150 is screw threaded for cooperation with the locking cylinder.

What is claimed is:

1. A locking system in combination with a linear device for rapidly adjusting and immobilizing a movable part relative to a fixed part, said linear device comprising a housing, at least a pair of elements consisting of a screw and a nut which are screw threadedly interengaged and carried by the housing for cooperation with the fixed and movable parts, the helix angles of the screw threads of the screw and nut being sufficiently large to ensure that the efficiency of the conversion of translation of one of said pair of elements into rotation of the other of said pair of elements is slightly positive, said system being adapted to be capable of locking a rotary element of said pair of elements after adjustment of the position of the movable part of said parts, said system comprising an abutment in the housing, a locking cylinder portion axially movably mounted in the housing and provided with inner screw threads conjugate with outer screw threads on the nut, and complementary splines which are provided in said conjugate screw threads and are parallel to the screw, an elastically yieldable element for biasing the locking cylinder portion against said abutment in the housing and into a position in which the splines of the locking cylinder portion are engaged with the splines of the nut and lock the nut against rotation, said adjusting device being then at rest, a screw thread formed in the housing and similar to the screw threads of the outer nut, so that the nut is capable of rotating in said screw thread formed in the housing and travelling axially through the housing and in the screw threads of the spline of locking cylinder portion when the locking cylinder portion is not engaged with the spline of nut, and manual control means associated with the locking cylinder portion for axially displacing the locking cylinder portion disengaging the locking cylinder portion from the splines of the nut and thereby unlocking the nut as concerns rotation and permitting the nut to rotate in the screw thread of the housing.

2. A device according to claim 1, wherein the housing has walls defining a compartment and the locking cylinder portion is disposed in the compartment, the walls of the compartment axially guiding the locking cylinder portion, the manual control means comprising a cable having an end integral with the locking cylinder portion and extending in a direction parallel to the screw, and said elastically yieldable element being a coil spring coaxial with the cable and bearing against an end of the compartment of the housing for exerting on the locking cylinder portion a thrust which maintains the splines of the locking cylinder portion in engagement with the splines of the outer screw threads of the nut so long as a sufficient pull in a direction opposed to said thrust is not exerted on the cable.

3. A device according to claim 2, wherein the screw thread of the housing is interrupted in an angular sector equal to an angular sector occupied by the locking cylinder portion so that the screw threads of the locking cylinder portion are capable of being placed in phase with the screw thread of the housing when the locking cylinder portion is in a nut-unlocking position thereof which nut may then rotate freely in a cavity defined by the housing and the locking cylinder portion.

* * * * *